United States Patent [19]
Larson et al.

[11] Patent Number: 5,975,769
[45] Date of Patent: Nov. 2, 1999

[54] UNIVERSAL FIBER OPTIC MODULE SYSTEM

[75] Inventors: Glen M. Larson, Spokane; Terry R. Mayberry, Veradale, both of Wash.

[73] Assignee: Telect, Inc., Liberty Lake, Wash.

[21] Appl. No.: 08/889,783

[22] Filed: Jul. 8, 1997

[51] Int. Cl.[6] .................................................. G02B 6/36
[52] U.S. Cl. ............................................ 385/53; 385/134
[58] Field of Search ................................. 385/53–56, 76, 385/77, 134–139

[56] References Cited

U.S. PATENT DOCUMENTS

| | | | |
|---|---|---|---|
| 4,585,303 | 4/1986 | Pinsard et al. | 385/53 |
| 4,900,123 | 2/1990 | Barlow et al. | 385/53 |
| 5,067,784 | 11/1991 | Debortoli et al. | 385/53 |
| 5,097,529 | 3/1992 | Cobb et al. | 385/135 |
| 5,212,761 | 5/1993 | Petrunia | 385/135 |
| 5,231,687 | 7/1993 | Handley | 385/139 |
| 5,363,465 | 11/1994 | Korkowski | 385/135 |
| 5,432,875 | 7/1995 | Korkowski | 385/27 |

*Primary Examiner*—John D. Lee
*Assistant Examiner*—Juliana K. Kang
*Attorney, Agent, or Firm*—Wells, St. John, Roberts, Gregory & Matkin, P.S.

[57] ABSTRACT

Disclosed is a universal and versatile fiber optic cable module system which can be used in combination with any one of a plurality of different front plates. The system also discloses module housings which can be combined with one another and attached to a front plate. Also disclosed is a method for providing such a universal and versatile fiber optic cable module system.

7 Claims, 5 Drawing Sheets

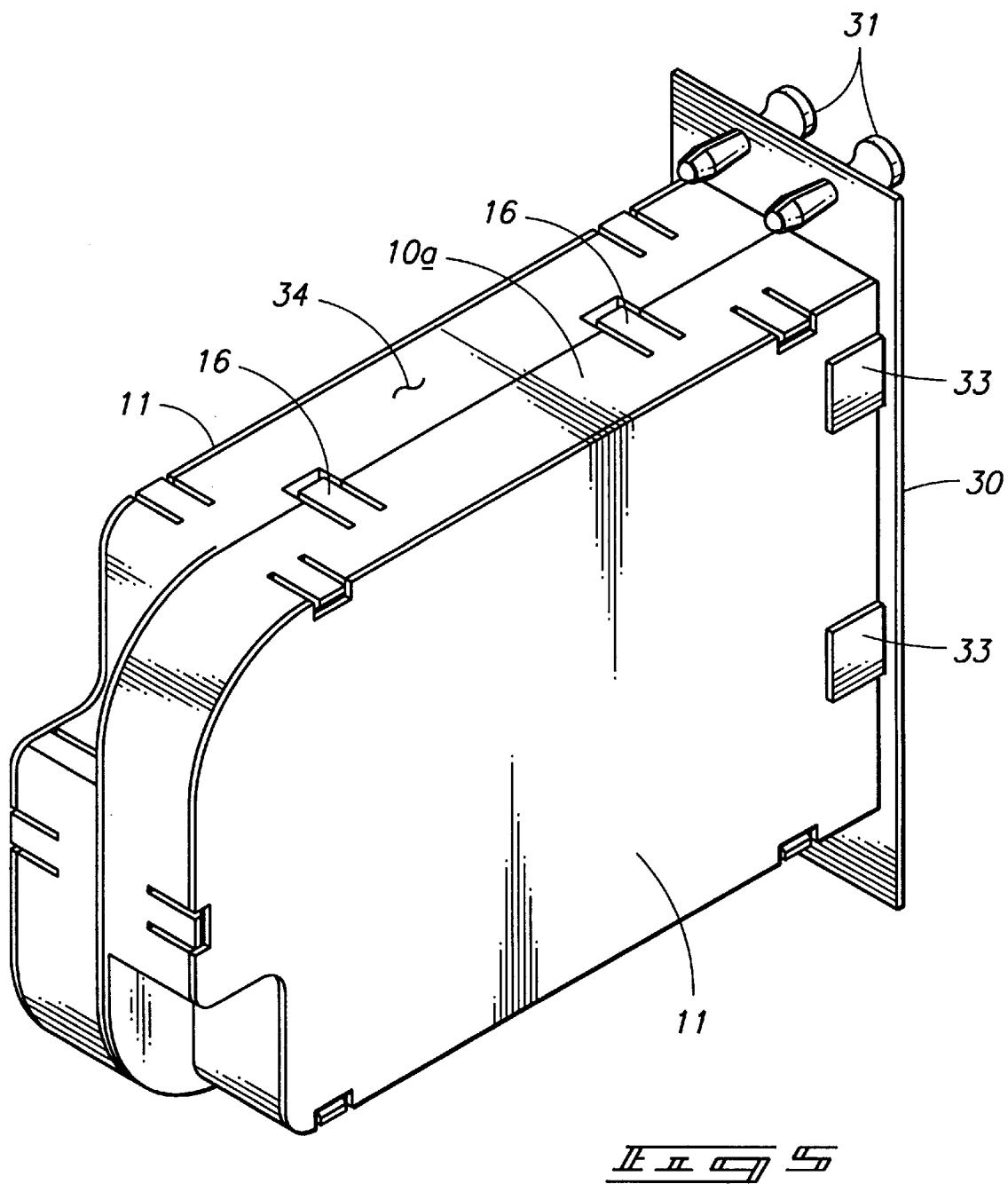

UNIVERSAL FIBER OPTIC MODULE SYSTEM

TECHNICAL FIELD

This invention generally pertains to a universal and versatile fiber optic cable module system for use in the telecommunications industry, more particularly, a module which can be used in combination with any one of a plurality of different front plates, and which can also be attached to, or stacked on, like modules, to form combined modules.

BACKGROUND OF THE INVENTION

Fiber optic cables are a commonly used means through which to transmit information in the telecommunications industry. For fiber based telecommunications systems, there are numerous fibers which need to be connected and routed to transmit the appropriate signals and transmissions to their intended destination. The connection and distribution or re-distribution of fiber cables generally occurs at a system location referred to as a fiber distribution frame.

The fiber optic distribution frame systems generally contain connector adapter devices which have two ends, each of which connect to a fiber optic adapter and a fiber optic connector attached to the adapter thereby operatively joining two fiber optic cables.

Known fiber optic distribution frame systems include a front and a rear side, with the rear side adapters connected to fiber optic cables which are in turn connected to fiber optic equipment of various types. The connections on the rear or back side of the frame system are typically made with the intent not to frequently change connections in the rear due to the more difficult access.

On the other hand, the fiber optic adapters on the front side of the fiber optic distribution frame and system generally endure more frequent switching of fiber optic cables and connectors from one adapter to another. The front side connectors and adapters are more typically used for cross connecting incoming signals to other fibers or to other fiber optic equipment.

In the telecommunications industry, different manufacturers utilize different fiber optic adapters, which are well known in the industry. Examples of different fiber optic adapters are ST fiber optic adapters, SC fiber optic adapters, D4 adapters, and FC fiber optic adapters. Each generally serves to connect two fiber optic cables, but each is configured differently from the others.

Modules or cassettes have been heretofore used to hold the fiber optic adapters and to retain slack fiber optic cable and other devices, such as splitters. In the typical prior art fiber optic module, a front plate retains the fiber optic adapters which join the two fiber optic cables.

Prior to this invention, a module—front plate combination was manufactured for each type of fiber optic adapter used and for each different configuration of a particular fiber optic adapter, and none may be used to house different front plates or different fiber optic adapters.

A typical telecommunications facility and company utilizes more than one type of fiber optic adapter and more than one configuration of fiber optic adapter modules. Such facilities and companies must therefore purchase and/or maintain in inventory, a multitude of configurations of fiber optic cable modules, each of which is only configured for one particular application.

Further, each facility and company is also limited in the uses it can make of existing modules in the event it has a need to rearrange or reconfigure its modules.

It is an object of this invention to provide one universal fiber optic module housing which can be used for each type of fiber optic adapter and in the various module configurations desired. A more particular object directed to the current commonly used fiber optic adapters, is to provide a fiber optic module which can be used for ST fiber optic adapters, SC fiber optic adapters, D4 adapters, and FC fiber optic adapters. This object is accomplished by providing a universal module housing which may be configured and connected to a plurality of different front plates, the different front plates retaining different types of fiber optic adapters.

It is a further object of this invention to provide a fiber optic module which can be utilized in applications wherein there is a single column of fiber optic adapters, and in applications wherein there are two or dual columns of fiber optic adapters. This invention accomplishes this object by providing a module which alone may be utilized for an application wherein there is a single column of fiber optic adapters, and which can be joined to a like fiber optic module to provide an integrated module which facilitates two columns of fiber optic adapters, with fiber feed between the two modules to accommodate a fiber cable containing as many as twelve fibers. The fiber is routed between two stacked modules through a breakout section in the body of the modules.

It is a still further object of this invention to provide a fiber optic module wherein the configuration maintains a minimum acceptable bending radius for fiber optic cable routed through the module.

It has been a long felt need for the universal module which can be used in combination with multiple different front plate configurations and with multiple types of fiber optic adapters. This invention satisfies this need with the advantages and features described herein.

BRIEF DESCRIPTION OF THE DRAWINGS

Preferred embodiments of the invention are described below with reference to the accompanying drawings, which are briefly described below.

FIG. 5 is a rear perspective view of the example illustrated in FIG. 4.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection and other means and components utilized in this invention are widely known and used in the field of the invention described, their exact nature or type is not necessary for an understanding and use of the invention by a person skilled in the art or science, and they will not therefor be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefor be discussed in significant detail.

This invention is directed to a universal fiber optic module which can be used for several different applications and in multiple configurations.

Figure 1C:
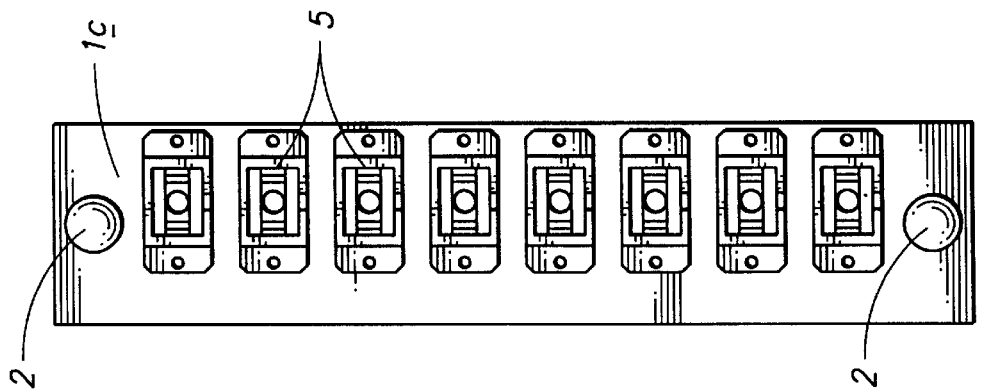
FIG. 1C is a front elevation view of one embodiment of a fiber optic front plate module contemplated by the invention, and referred to as the SC fiber optic adapter.
Figure 1B:
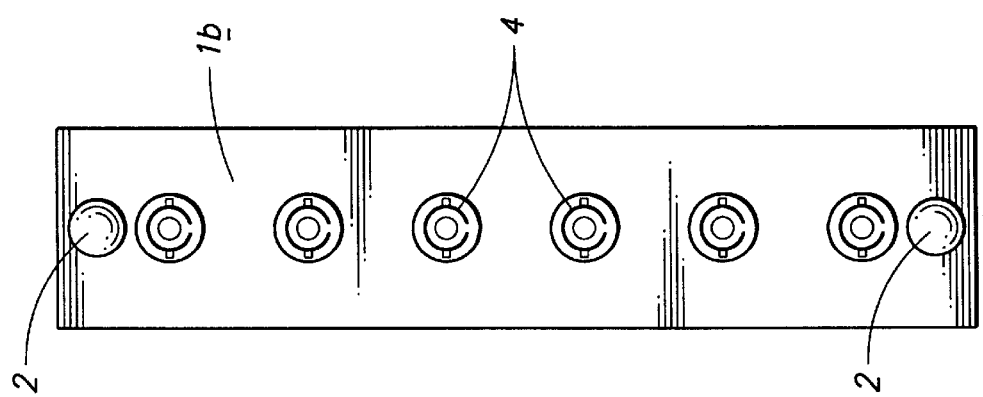
FIG. 1B is a front elevation view of one embodiment of a fiber optic front plate module contemplated by the invention, and referred to as the ST fiber optic adapter.
Figure 1A:
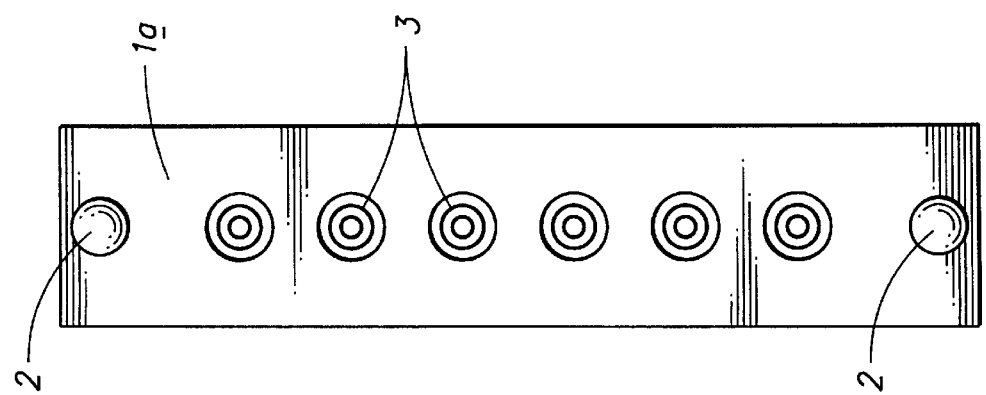
FIG. 1A is a front elevation view of one embodiment of a fiber optic front plate module contemplated by the invention, and referred to as the FC fiber optic adapter.

FIG. 1A is a front elevation view of a front plate 1, illustrating one embodiment of a front plate which may also be used in this invention. The front plate 1 includes a plurality of apertures to receive the FC fiber optic adapter 3 inserted in the front plate 1 in a single column. The front plate retaining members 2 illustrated are pin connectors and may be used to attach the front plate 1a to a frame structure or housing, or even to a module housing. However, this invention is not limited to any particular type of front plate retaining member, as many types may be used to attach, mount or connect the front plate. Furthermore, in some embodiments of this invention, there may be no need for a front plate retaining member.

FIG. 1B is a front elevation illustration of a second embodiment of a front plate 1, which contains a plurality of fiber optic adapter apertures to receive ST fiber optic adapters 4 inserted in said front plate 1. FIG. 1B also illustrates pin connectors as the front plate retaining member 2 utilized to attach or connect the front plate 1 to the frame, housing or module housing.

FIG. 1C is a front elevation illustration of another type of front plate which contains a plurality of fiber optic adapter apertures to receive SC fiber optic adapters 5 inserted in the front plate 1. FIG. 1C also illustrates pin connectors as the front plate retaining member 2 utilized to attach or connect the front plate 1 to the module.

It will be appreciated by those skilled in the art that this invention is not limited to modules for use with FC, ST and SC fiber optic adapters, but instead the modules would similarly work with other fiber optic adapters, such as D4 fiber optic adapters or others.

Figure 2:
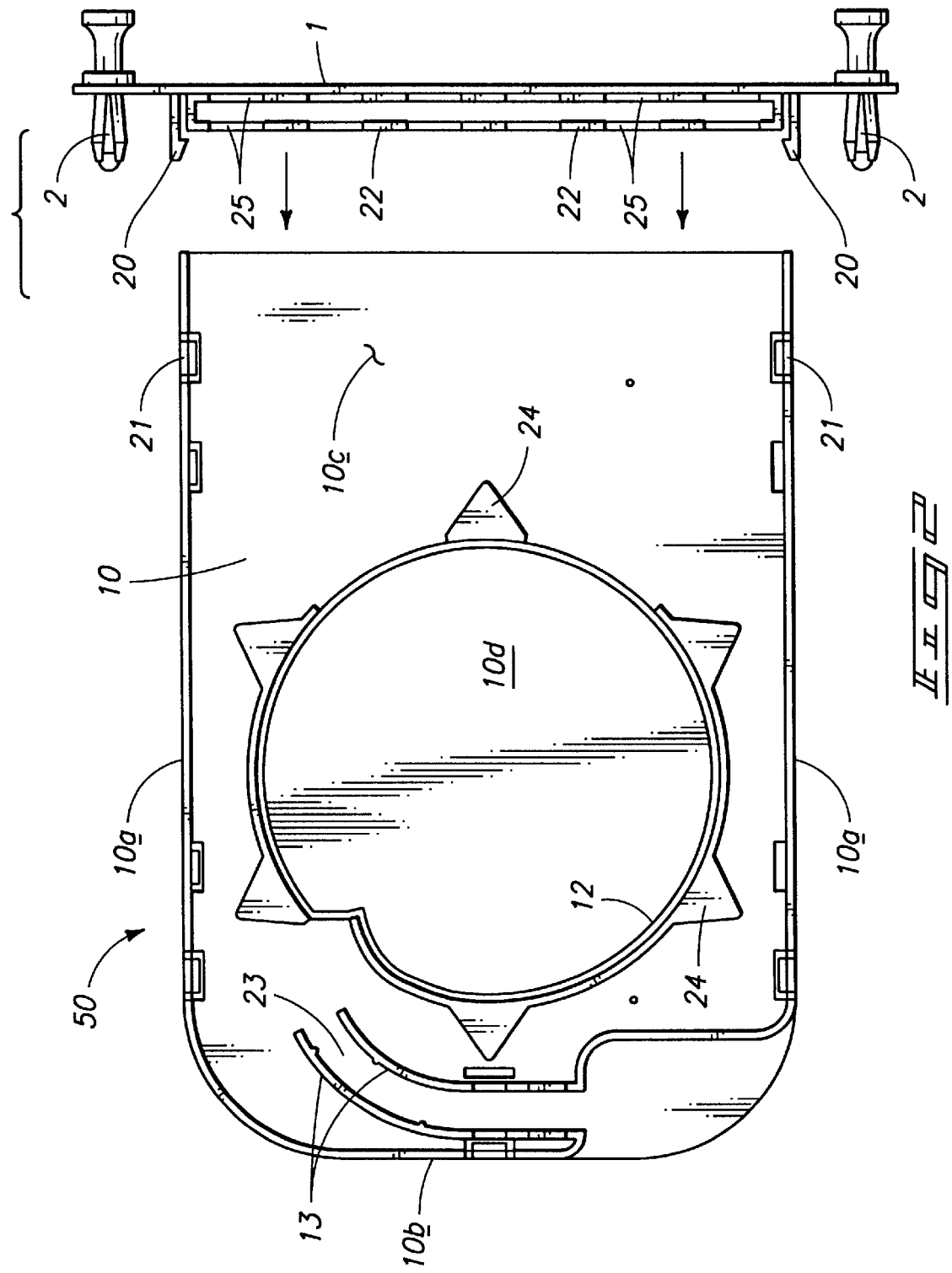
FIG. 2 is a side view of one example of a fiber optic module, showing a front plate for attachment to the front thereof.

FIG. 2 illustrates an exploded side view of one embodiment of this invention, including front plate 1 with fiber optic adapter apertures 22. The fiber optic adapter apertures 22 receive and retain the fiber optic adapters (not shown in FIG. 2) which are inserted in front plate 1.

Figure 3:
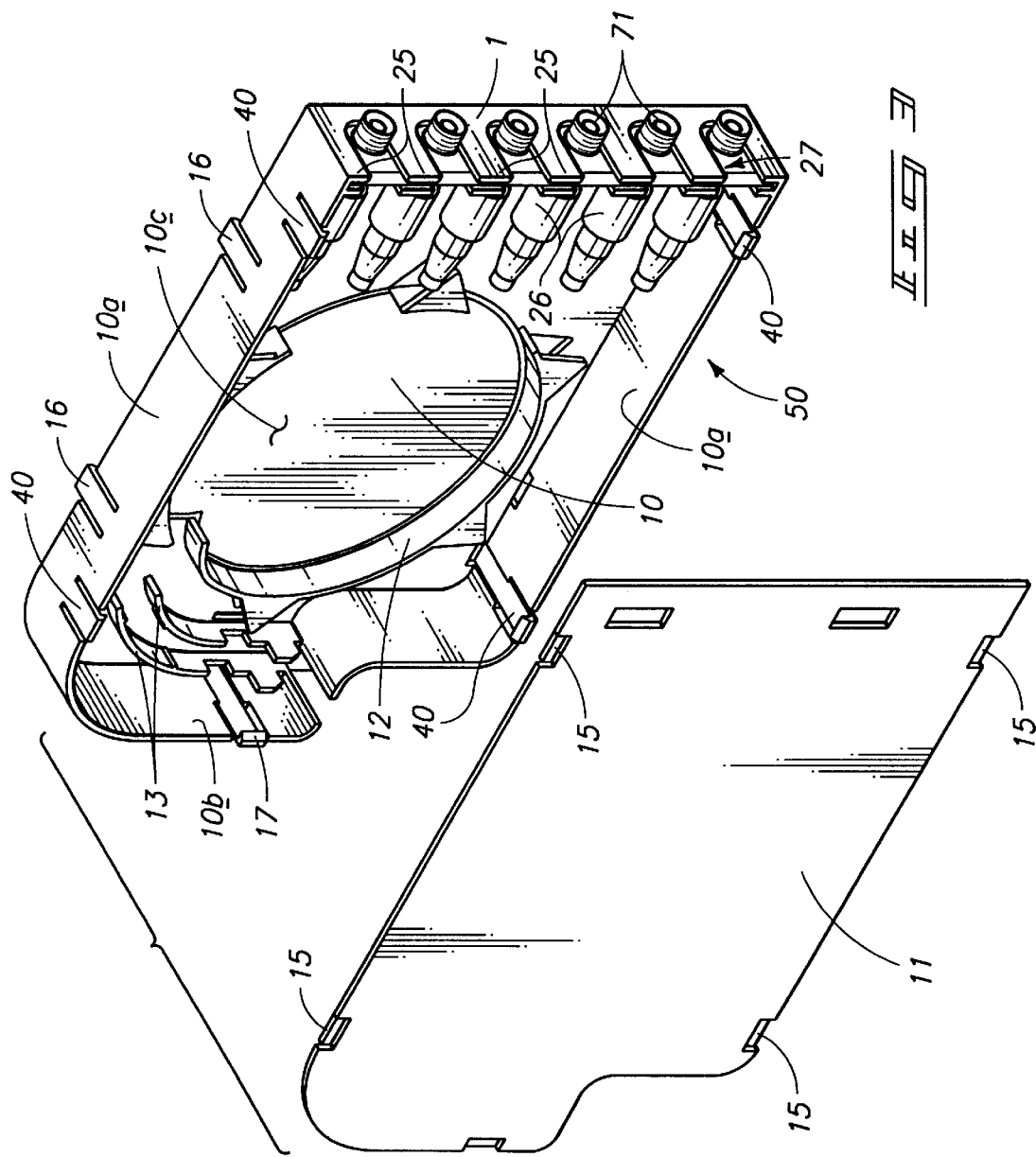
FIG. 3 is a perspective exploded view of one example of a fiber optic module contemplated by this invention.

The fiber optic adapter holders 25 are shown in FIG. 2 as part of the front plate 1, however, it will be appreciated by those skilled in the art that the fiber optic adapter apertures 22 may be part of the module housing 10, as illustrated in FIG. 3 for example.

The fiber optic module 50 as shown in FIG. 2 is comprised of a front plate, the module housing 10 and would typically also include a module housing cover 11 (not shown in FIG. 2).

FIG. 2 shows one way to attach the front plate 1 to the fiber optic module housing 10, illustrating the front plate mount devices 20 for mounting the front plate 1 to the module housing 10. In the example shown in FIG. 2, the front plate mount devices 20 are latch devices which combine with latch apertures 21 to mount the front plate 1 on the fiber optic module housing 10. A pin connector, as well as several other specific devices, may act as the front plate mount device 20.

It will be appreciated by those skilled in the art the numerous ways or design choices which may be utilized for the front plate mount devices 20 to mount the front plate to the fiber optic module, with the preferred device being illustrated. It will also be appreciated that the front plate mount devices 20 may be mounted on the fiber optic module housing 10 or on the front plate 1 as shown, or on the sides of the module housing as shown more fully in FIG. 5, and in any one of a multiple of other specific locations on the front plate 1 or on the fiber optic module housing 10. A further example of this is more fully illustrated and described in reference to FIG. 5 wherein the front plate mount devices 33 are configured to mate with apertures on the sides of the fiber optic module housing 10 instead of on the top and bottom of the fiber optic module housing 10.

Because the current invention is intended to facilitate the use of multiple different fiber optic adapters, it will be appreciated that the fiber optic adapter apertures 22 may be in many different shapes and configurations to facilitate the insertion of various types of fiber optic adapters. Furthermore, it will be appreciated by those skilled in the art that a specific configuration for a module housing 10 is not required to practice this invention to its fullest extent.

One embodiment of a module housing 10 and a front plate 1, i.e. the fiber optic module, is shown in FIG. 2. The module housing 10 includes longitudinal walls 10a, side wall 10c and rear wall 10b. Attached to side wall 10c is cable spindle 12 with cable holders 24.

FIG. 2 further shows the breakout wall section 10d, which in the embodiment shown is the area within cable spindle 12. Breakout wall section 10d is utilized when two modules are stacked or attached together as more fully shown in FIG. 4. When the breakout wall section 10d is removed, the remaining aperture may be used to route cable and other devices between the two modules. The breakout feature may be accomplished in any one of a number of different ways, such as a thinner wall section around the desired breakout wall 10d area, a perforation around the perimeter of the breakout wall 10d area, or other ways known to those skilled in the trade.

FIG. 2 further illustrates fiber passageway 23 toward the rear of the module housing 10, said fiber passageway 23 facilitating the routing of fiber optic cable through the rear of the fiber optic module. Passageway walls 13 serve to route the fiber optic cable through the rear wall 10b of the fiber optic module housing 10.

It should be noted that the cable spindle 12 and the passageway walls 13 assure that the minimum bending radius for the fiber optic cable being utilized will not be exceeded. Fiber cables are generally known and there are inherent problems in bending fibers to below a perdetermined bending radius, such problems include cracking, breakage and other related defects. A minimum bending radius of one and one-half inches for a three millimeter diameter fiber cable has been a recognized standard below which a fiber cable should not be bent. Cable holders 24 are attached to cable spindle 12 and serve to hold the fiber cable in position as and after it is wound around cable spindle 12.

FIG. 3 shows a perspective exploded view of one example of the invention with the fiber optic adapters 71 inserted in front plate 1. FIG. 3 further shows module housing cover 11 as it may be positioned to attach it to module housing 10.

The module housing cover 11 can be attached to the module housing 10 in any one of several different ways, the embodiment shown in FIG. 3 illustrating cover latches 40 which interlock with cover latch apertures 15 to attach the module housing cover 11 to the module housing 10.

FIG. 3 also illustrates fiber optic connectors 26 connected to fiber optic adapters 71, the fiber optic adapters 71 being housed or held in fiber optic adapter apertures 27.

The items in FIG. 3 similarly marked to those in FIG. 2 represent the same components.

Figure 4:
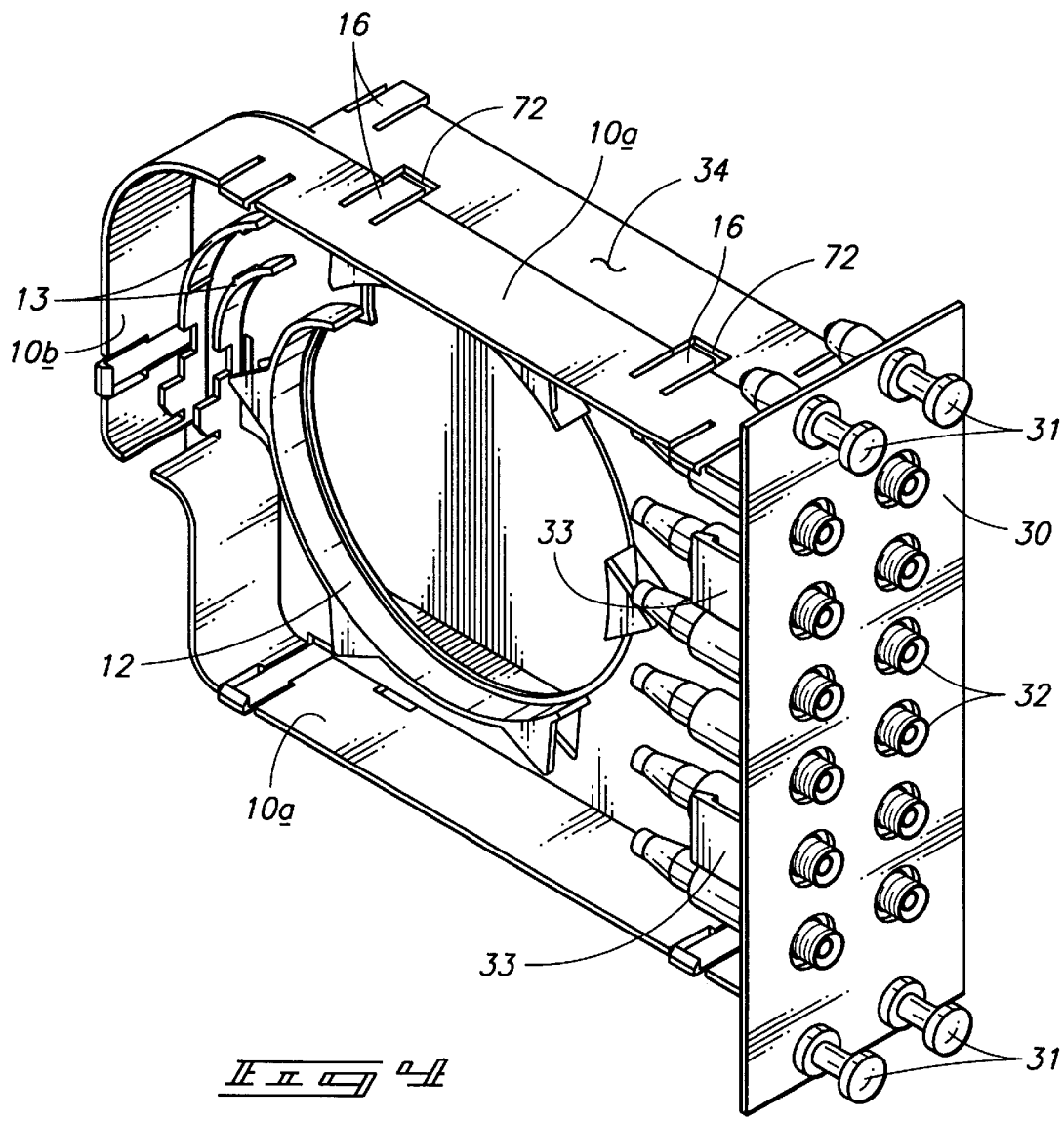
FIG. 4 is a top perspective view of another example of a configuration of how a combination of two fiber optic module housings can be attached together and used with a duel front plate connector.

FIG. 4 illustrates one of the versatile features of this universal fiber optic module housing in that one module housing may be attached to another identical or like module housing to allow the two module housings to receive a single front plate 30. The fiber optic adapter configuration in two columns illustrated in FIG. 4 is another configuration for which fiber optic adapter modules are used in the industry and the ability to stack or connect two module housings together for use in connection with a single dual column front plate is a real advantage and makes the fiber optic adapter module very versatile.

The ability to stack or attach one module to another also allows for fiber cables containing as many as twelve fibers to be terminated in one module as there is an aperture between the two stacked modules, which allows the two modules with six ports each.

Illustrated in FIGS. 4 and 5 are the way that the module housing 10 is attached to an adjacent module housing by merely rotating it and then attaching it a module housing attachment device, which in FIG. 4 is the combination of latches 16 and latch apertures 72.

Each fiber optic module housing includes a module housing attachment mechanism which allows one module housing to be attached or connected to another identical or like module housing. It will be appreciated by those skilled in the art that there are numerous ways to practice a module housing attachment mechanism, with no one in particular being required to practice the invention. In the embodiment illustrated in FIG. 4, the module housing attachment mechanism is a combination of attachment latches 16, combined with latch aperture 72, which interact to retain the two module housings together.

FIG. 4 shows a first module housing 10 and a second module 13 housing 34 connected by attachment latches 16 into latch apertures 72. The respective module housings can be reversed or alternated and simply snapped together causing attachment latches 16 to attach within latch apertures 72. FIG. 4 therefore also illustrates how the first module housing 10 and the second module housing 34 may be attached to connected to form a combined fiber optic module housing and when the front plate is mounted thereon, to form a combined or integrated fiber optic module.

Front plate retaining members 31 may then utilized to attach or connect the combined fiber optic module housing to a distribution frame or other housing means into which the module housings will be placed.

The items in FIG. 4 similarly marked to those in FIG. 2 or 3 represent the same components.

FIG. 5 is a rear perspective view of a first module housing 10 and a second module housing 34, attached together, with module housing cover 11 attached to module housing 10. Front plate 30 is attached or mounted to the combined module housings by front plate mount devices, which are illustrated as latches 33, which combine with latch apertures in the respective module housings.

FIG. 5 further illustrates front plate connectors 31 which may connect and hold the front plate 30 to the fiber optic distribution frame or other structure into which the fiber optic modules will be attached or inserted.

The items in FIG. 5 similarly marked to those in any other figures represent the same components.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalents.

We claim:

1. A combined universal fiber optic connector module comprising:
   a. a first module housing;
   b. a second module housing which is substantially the same as the first module housing, and which is attached to the first module housing, thereby forming a combined module housing; and
   c. a front plate mounted to the combined module housing, said front plate including a plurality of fiber optic adapter apertures.

2. A combined universal fiber optic connector module as recited in claim 1, and further comprised of:
   a. a longitudinal wall positioned between the first module housing and the second module housing, the longitudinal wall including a breakout wall section aperture.

3. A method for providing a universal fiber optic connector module, comprising the following steps:
   a. providing a module housing which is comprised of:
      i. a side wall;
      ii. at least one longitudinal wall;
      iii. a rear fiber passageway through which fiber optic cable may be routed;
   b. providing a plurality of front plates, each with a plurality of fiber optic adapter apertures;
   c. mounting one of the plurality of front plates to the module housing;
   d. providing a second front plate, the second front plate including a plurality of fiber optic adapter apertures different than the plurality of fiber optic adapter apertures for the front plate; and
   e. dismounting the front plate from the module housing; and
   f. mounting the second front plate to the module housing.

4. A method for combining two universal fiber optic connector modules, comprising the following steps:
   a. providing a first module housing and a second module housing which is substantially the same as the first module housing;
   b. attaching the first module housing to the second module housing, thereby forming a combined module housing;
   c. providing a front plate which includes a plurality of fiber optic adapter apertures; and
   d. mounting the front plate to the combined module housing.

5. A method for combining two universal fiber optic connector modules as recited in claim 4, and further comprising the following steps:

a. providing a longitudinal wall positioned between the first module housing and the second module housing, the longitudinal wall including a breakout wall section aperture; and b. removing the breakout wall section from the longitudinal wall to facilitate the routing of fiber optic cable through the resulting aperture.

6. A method for combining two universal fiber optic connector modules, comprising the following steps:

a. providing a first module housing and a second module housing which is substantially the same as the first module housing, each of which is comprised of:
 i. a side wall;
 ii. at least one longitudinal wall;
 iii. a rear fiber passageway through which fiber optic cable may be routed;

b. attaching the first module housing to the second module housing, thereby forming a combined module housing;

c. providing a front plate which includes a plurality of fiber optic adapter apertures; and d. mounting the front plate to the combined module housing.

7. A method for combining two universal fiber optic connector modules as recited in claim 6, and further comprising the following steps:

a. providing a longitudinal wall positioned between the first module housing and the second module housing, the longitudinal wall including a breakout wall section aperture; and b. removing the breakout wall section from the longitudinal wall to facilitate the routing of fiber optic cable through the resulting aperture.

* * * * *

UNITED STATES PATENT AND TRADEMARK OFFICE
CERTIFICATE OF CORRECTION

PATENT NO.  : 5,975,769
DATED       : November 2, 1999
INVENTOR(S) : Glen M. Larson and Terry R. Mayberry It is certified that error appears in the above-identified patent and that said Letters Patent is hereby corrected as shown below:

column 5, line 45 of the patent, the numeral 13 is erroneously inserted into the printed patent. The patent is corrected to read "and a second module housing 34".

Signed and Sealed this

Twelfth Day of September, 2000

Attest:

Q. TODD DICKINSON

Attesting Officer

Director of Patents and Trademarks